United States Patent [19]
Swank
[11] Patent Number: 5,036,577
[45] Date of Patent: Aug. 6, 1991

[54] METHOD OF FORMING A SHRINK FIT IMPLOSION PROTECTION BAND

[75] Inventor: Harry R. Swank, Lancaster, Pa.

[73] Assignee: Thomson Consumer Electronics, Inc., Indianapolis, Ind.

[21] Appl. No.: 443,524

[22] Filed: Nov. 30, 1989

[51] Int. Cl.[5] .......................... B23P 11/02; H04N 5/65
[52] U.S. Cl. .......................................... 29/446; 29/407; 72/378; 73/826; 358/246
[58] Field of Search .................. 358/246; 29/446, 407, 29/421.1, 447; 72/392, 393, 378; 73/832, 760, 785, 788, 826

[56] References Cited

U.S. PATENT DOCUMENTS

| | | | |
|---|---|---|---|
| 3,412,600 | 11/1968 | Powell et al. | 358/246 X |
| 4,459,735 | 7/1984 | Sawdon | 29/509 |
| 4,641,196 | 2/1987 | Musha et al. | 358/246 |
| 4,668,993 | 5/1987 | Hermann | 358/246 X |
| 4,701,802 | 10/1987 | Omae et al. | 358/246 |
| 4,757,609 | 7/1988 | Sawdon et al. | 29/798 |

*Primary Examiner*—Joseph M. Gorski
*Attorney, Agent, or Firm*—J. S. Tripoli; D. H. Irlbeck; L. L. Hallacher

[57] ABSTRACT

A shrink fit implosion protection band for a CRT having rounded corners is stretched along the diagonals by 1.0% to 1.5% to form necked down areas in the band.

8 Claims, 2 Drawing Sheets

METHOD OF FORMING A SHRINK FIT IMPLOSION PROTECTION BAND

BACKGROUND

This invention relates generally to implosion protection bands for cathode ray tubes (CRT's) and particularly to a method of forming a shrink fit implosion protection band.

Cathode ray tubes are evacuated to a very low internal pressure and accordingly are subject to the possibility of implosion due to the stresses produced by atmospheric pressure acting on all surfaces of the tube. This problem has been addressed in the art by providing CRTs with implosion protection bands. Such bands are used to apply a compressive force to the side walls of the CRT to redistribute some of the faceplate forces. The redistribution of the faceplate forces decreases the probability of an implosion of the tube by minimizing tension in the corners of the faceplate. Implosion protection bands are also beneficial because they improve the impact resistance of the tube. Glass in compression is stronger than glass which is not in compression. The band causes compression in faceplate areas which otherwise are in tension. Additionally, in the event of an implosion the redistributed stresses cause the imploding glass to be directed toward the back of the cabinet in which the tube is mounted, thereby substantially reducing the probability of someone in the vicinity of the imploding tube being injured.

Implosion protection bands of the shrink fit type typically are manufactured by forming a strip of steel into a loop having the same configuration as the faceplate to be protected and joining the two ends of the strip on one side of the band. In some instances, the band is made by joining two identical strips on two sides of the loop. For both types of bands, the periphery of the loop is slightly smaller than the periphery of the faceplate. The lop is heated to approximately 300° C. and 500° C. and the coefficient of expansion of the material causes the loop to expand to dimensions permitting the loop to be slipped around the sides of the faceplate. As the band cools it shrinks and tightly surrounds the faceplate, thereby applying the necessary implosion protection compression to the faceplate sidewalls. The compressive force can be accurately controlled by accurately dimensioning the band because the coefficient of expansion of the banding material is known.

The ends of the strips are permanently joined by either welding or crimping. In either event, because the band is used to apply substantial pressure to the sidewalls of the tube it is essential that the joint formed when the two ends are coupled together be sufficiently strong to withstand the pressure. It is therefore important to test the integrity of the joint prior to applying the band to a CRT. It is also important to prepare the loop in a manner which assures that the loop will properly seat on the sidewalls of the CRT and will apply optimum compressive forces to the CRT. The present invention fulfills these important criteria.

SUMMARY

A method of forming a shrink fit rim band for a substantially rectangular CRT having rounded corners includes the steps of forming at least one of strip of material into a substantially rectangular loop having rounded corners and dimensions slightly smaller than the dimensions of the CRT. The diagonal dimensions of the loop are expanded by approximately 1.0% to 1.5% by stretching the loop along the diagonals to form slightly necked down areas in the loop.

CROSS REFERENCE TO RELATED APPLICATIONS

This invention can be used with the invention described in application Ser. No. 443,202 titled "Improved Shrink Fit Implosion Protection Band" filed on even date herewith by H. R. Swank.

DETAILED DESCRIPTION

Figure 1:
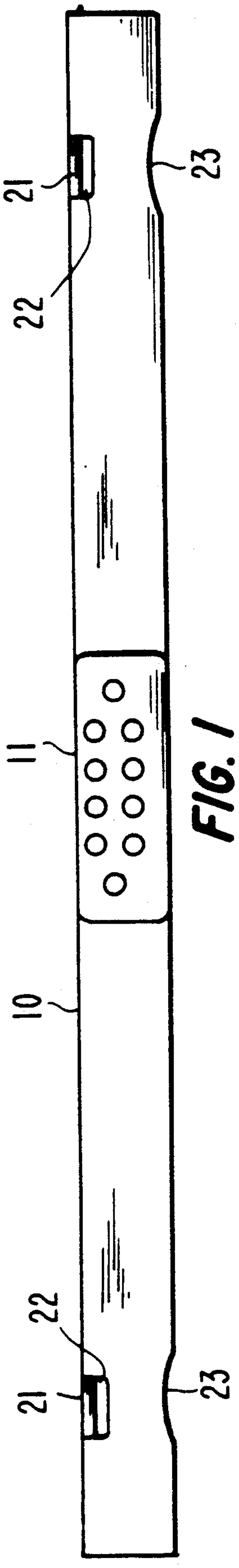
FIG. 1 is a side view of a preferred embodiment.
Figure 2:
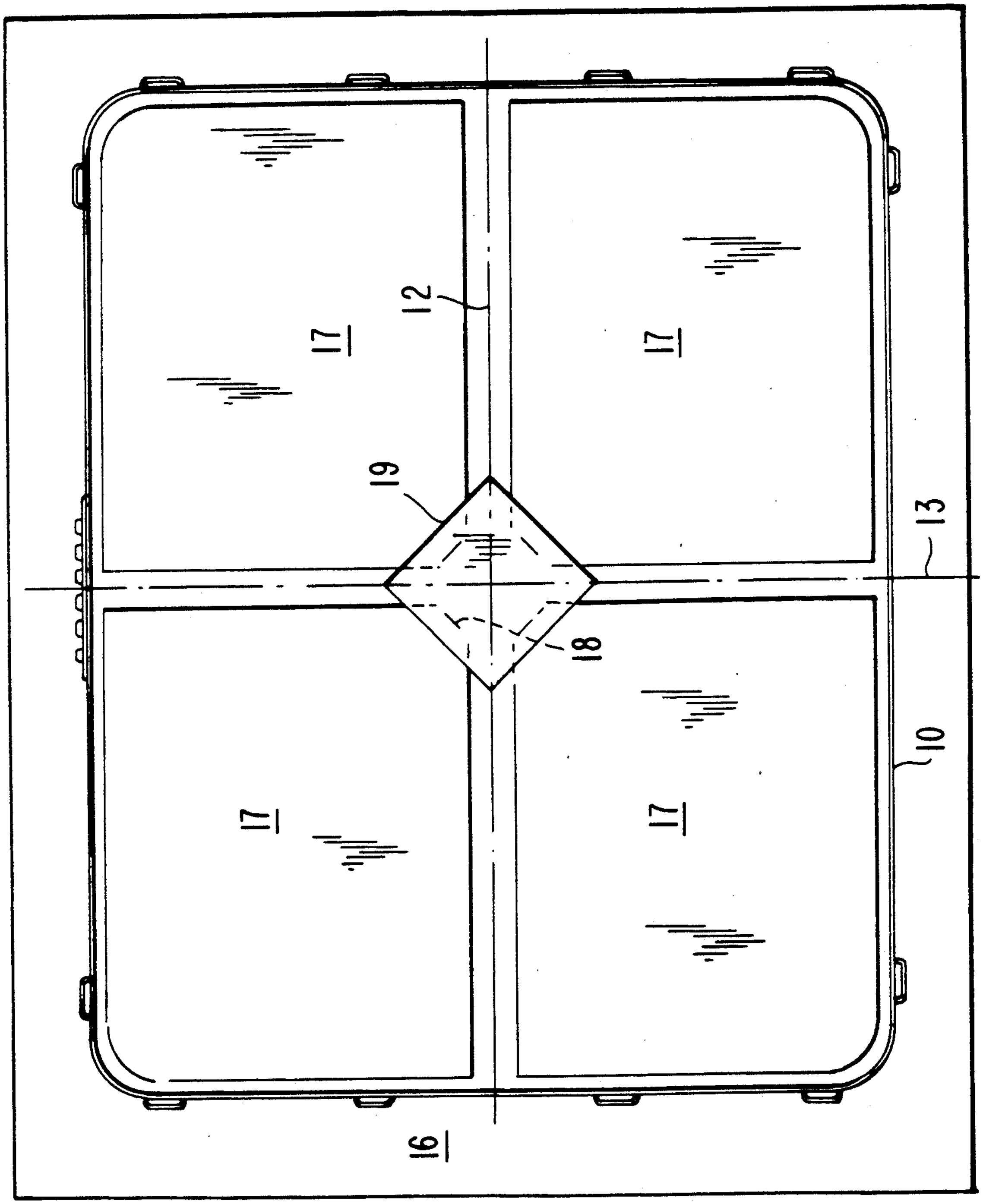
FIG. 2 is a top view of the preferred embodiment of FIG. 1 including a simplified showing of apparatus for stretching and forming the rimband.

In FIGS. 1 and 2, a shrink fit implosion protection band 10 is formed into a loop by joining the ends of a steel strip at a joint 11. The ends of the strip can permanently be joined either by welding or crimping. In FIGS. 1 and 2 crimping is the illustrated technique and is preformed in a manner described in U.S. Pat. Nos. 4,459,735 and 4,757,609. After the ends are joined, the band 10 is in the form a loop having a major axis 12 and a minor axis 13. The dimensions of the major and minor axes, and thus also the periphery, of the loop are slightly less than the corresponding dimensions of the tube to which the band 10 will be applied. The band 10 has rounded corners 14. It has been found that the band seats on the tube and applies optimum compressive forces to the sidewalls of the tube when the inside radius of the corners 14 of the band 10 is substantially equal to the outside radius of the corners of the faceplate. Typically a tape having an adhesive on both sides is applied to the tube where the band is be located. The tape adds to the adherence of the band at the corners and thus helps to maximize the tension along the sides of the band. Accordingly, as the band shrinks optimum compressive forces are applied to the corners of the tube and the band 10 more uniformly contacts the entire tube.

Figure 4:
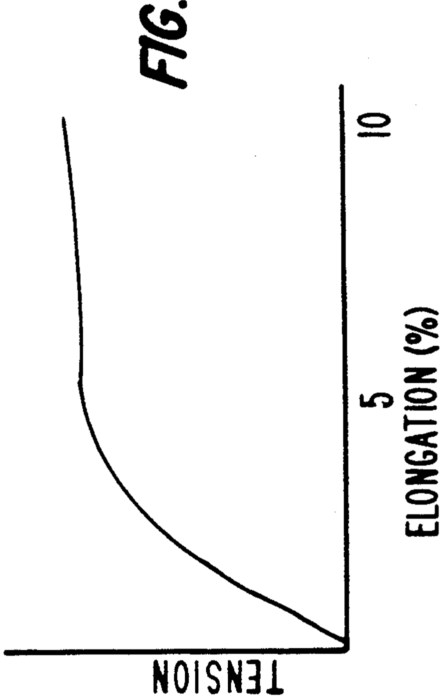
FIG. 4 is a typical elongation curve for a material from which bands can be made.

It has also been learned that it is advantageous to stretch the band 10 to slightly exceed the elastic limit of the metal thereby causing the metal to yield in predetermined areas. Several advantages are realized by such prestressing of the band material beyond the elastic limit. The material has already yielded and thus will apply a known predictable tension to the tube. This is evident from FIG. 4 which shows that the tension remains substantially constant after approximately 5% elongation. Also, the stretching verifies the integrity of the joint 11. The stretching also forms a necked down area 23 which serves as proof that the joint 11 was tested.

Figure 3:
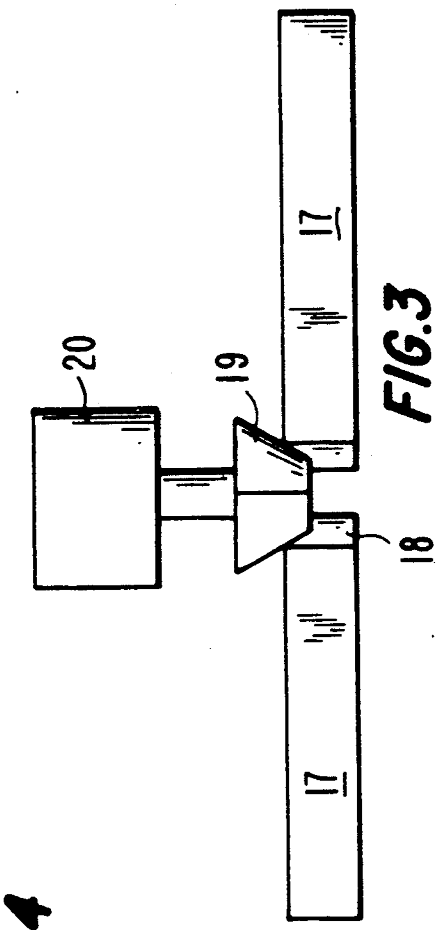
FIG. 3 is a simplified side view of the stretching and forming apparatus.

FIGS. 2 and 3 are simplified showings of equipment which can used to stretch the band 10 in order to realize the above enumerated advantages. The band 10 is supported in some convenient manner, such as by a support 16. A plurality of plates 17 are arranged to lie within the loop 10.

The plates 17 are slideably affixed to the support 16, and are slidable in directions parallel to the diagonals of the apparatus, and thus to those of the loop after it is formed. The plates 17 are each shaped as one quarter of the band and thus form and dimension the band 10 as desired. The plates are spaced apart a small distance and can have a corner removed to form a bevel 18. The bevels are parallel to the diagonals of the apparatus. A wedge 19 is arranged between the bevels 18 and is urged against the plates 17 by a cylinder 20. Actuation of the cylinder 20 urges the wedge 19 between the plates and causes the plates to move against and stretch the loop 10. The travel distance of the plates 17 is accurately controllable by controlling the stroke of the cylinder 20. The band 10 is thus laid around the plates 17 and the cylinder 19 is actuated to move the plates a distance sufficient to stretch the band material by 1.0% to 1.5%. After the band is stretched the cylinder is retracted and the band is removed from the apparatus. The band 10 is thus formed into the desired shape and the inside radius of the corners is equal to the outside radius of the corners of the tube upon which the band will be fitted.

Band 10 includes hooks, or lances 21, which are provided on both sides of the corners 14 and at other locations throughout the band 10. The lances 21 are used to connect degaussing coils and other apparatus necessary for the operation of the tube to the outside of the tube. The lances 21 are arranged along one edge of the band 10 and small cutout portions 22 lie adjacent each of the lances. Accordingly, when the band 10 is stretched necked down areas 23 are formed in the band immediately adjacent to the lances 21. The formation of the necked down areas is advantageous for several reasons. Firstly, they are direct evidence that the integrity of the joint 11 has been tested by the stretching of the bands after the formation of the joint. Also, the necked down areas can be used in a test to verify that the stretching has been done. In such a test the band 10 is laid on a lighted table with the necked down portions 23 laying on the table and the lances facing upwardly. The necked down areas are then immediately visible as a verification that the joint 11 has been tested for integrity and the absence of the necked down areas 21 results in rejection of the band. In FIG. 1 the necked down areas 23 are exaggerated for convenience of illustration. However, the areas are visually evident in bands applied to the CRT's and thus serve as evidence that the band has been properly formed and tested.

What is claimed is:

1. A method of forming a shrink fit implosion protection band prior to applying said band to a substantially rectangular CRT having rounded corners comprising the steps of:

forming at least one strip of material into a substantially rectangular loop having rounded corners and dimensions slightly smaller than corresponding dimensions of said CRT by joining ends of the at least one strip to each other;

stretching said loop along its diagonals to slightly exceed the elastic limit of the material from which said loop is made thereby expanding the diagonal dimensions of said loop by approximately 1.0% to 1.5% and thereby forming slightly necked down areas in said loop.

2. The method of claim 1 wherein the inside radius of the corners of said loop are substantially equal to the outside radius of the corners of said CRT.

3. The method of claim 1 wherein said joining step includes welding the ends of said strip together.

4. The method of claim 1 wherein said joining step includes crimping the ends of said strip together.

5. A method of testing an implosion protection band prior to applying said band to a substantially rectangular CRT having rounded corners comprising the steps of:

forming at least one strip of material into a substantially rectangular implosion protection band having rounded corners and dimensions slightly smaller than corresponding dimensions of said CRT by joining ends of the at least one strip to each other, thereby forming a joint where the ends are joined;

testing the joint by stretching said band along its diagonals to slightly exceed the elastic limit of the band material thereby expanding the diagonal dimensions of said band by approximately 1.0% to 1.5% and thereby forming slightly necked down areas in said band.

6. The method of claim 5 wherein the inside radius of the corners of said band are substantially equal to the outside radius of the corners of said CRT.

7. The method of claim 5 wherein said joining step includes welding the ends of said strip together.

8. The method of claim 5 wherein said joining step includes crimping the ends of said strip together.

* * * * *